United States Patent Office 3,080,398
Patented Mar. 5, 1963

3,080,398
2-HALOMETHYL-Δ²-ANDROSTENES AND
DERIVATIVES THEREOF
Albert Bowers, John Edwards, and James C. Orr, all of
Mexico City, Mexico, assignors to Syntex S.A., Mexico
City, Mexico, a corporation of Mexico
No Drawing. Filed Apr. 13, 1962, Ser. No. 187,222
18 Claims. (Cl. 260—397.4)

The present invention relates to certain new cyclopentanophenantrene derivatives and to the method for making the same.

More particularly it relates to the novel 2-halomethyl-Δ²-androstenes, which may be further substituted at C–17α by an alkyl, alkenyl or alkynyl group as well as to the 19-nor derivatives and the esters thereof.

The present invention relates also to a new method for making 2α-halomethyl-androstan and 19-nor-androstan-17β-ol-3-one derivatives, which have been described in our copending application Serial No. 107,039, filed on May 2, 1961.

The novel compounds object of our invention are potent anabolic agents with a favorable anabolic-androgenic ratio, lower the blood cholesterol level, relieve premenstrual tension and exhibit anti-estrogenic and anti-gonadotrophic activities. The 17α-alkenyl and alkynyl compounds are also progestational agents.

The novel compounds of the invention are represented by the following formula:

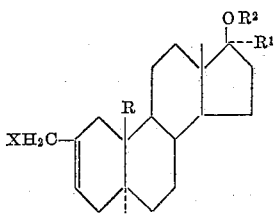

In the above formula R represents hydrogen or methyl, $R^1$ represents hydrogen or a lower alkyl, alkenyl or alkynyl group containing up to 8 carbon atoms; X represents chlorine, bromine or fluorine and $R^2$ represents hydrogen or a hydrocarbon carboxylic acyl radical of less than 12 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

In our copending patent application Serial No. 146,455, filed on October 20, 1961, there is described the method for producing 2-hydroxymethyl-Δ²-androsten-17β-ol, the 17α-substituted derivatives and the corresponding 19-nor compounds by reducing 2-formyl-Δ²-androstenes and 2-formyl-Δ²-19-nor-androstenes with sodium borohydride.

The novel 2-halomethyl-Δ²-compounds of the present invention are obtained from the 2-hydroxymethyl-Δ²-androsten compounds by a method illustrated by the following equation:

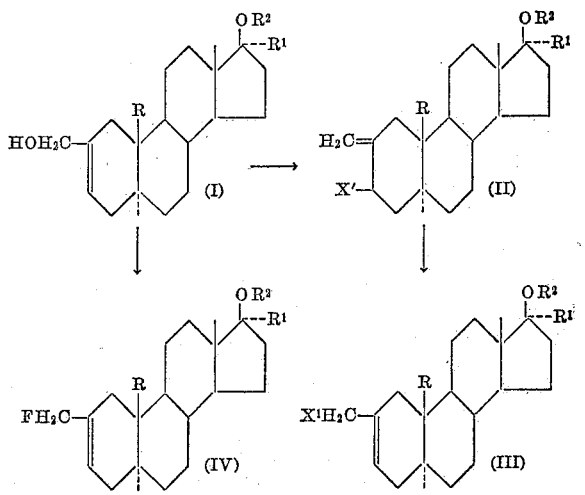

In the above formula R, $R^1$ and $R^2$ have the same meaning as heretofore set forth; $X^1$ represents chlorine or bromine.

In practicing the process set forth above 2-hydroxymethyl-Δ²-androsten-17β-ol, 2 - hydroxymethyl-19-nor-Δ²-androsten-17β-ol, the esters thereof or the corresponding 17α-substituted derivatives (I) is treated with thionyl chloride in benzene solution. The reaction is effected at room temperature, for a period of time in the order of 5 minutes to 1 hour, thus producing the 3β-chloro-2-methylene derivatives (II: $X^1$=chlorine) which upon heating with lithium chloride in dimethylformamide, for a period of time of 18 to 24 hours at 90° C. give rise to the corresponding 2-chloromethyl-Δ²-androstenes and 19-nor-androstenes (III: $X^1$=chlorine). In a similar manner, but using thionyl bromide and lithium bromide instead of the corresponding chlorides, there are produced 3β-bromo-2-methylene and 2-bromomethyl-Δ²-androstenes and 19-nor-androstenes (II and III: $X^1$=bromine).

In order to obtain the 2-fluoromethyl-Δ²-androstenes object of the present invention, a 2-hydroxymethyl derivative of Δ²-androsten-17β-ol-19-nor-Δ²-androsten-17β-ol, the corresponding 17α-alkyl, alkenyl or alkynyl derivatives or esters thereof is reacted with anhydrous hydrogen fluoride in mixture with methylene chloride-tetrahydrofuran, at low temperature, preferably between —70° and 0° C. for a period of time in the order of 15 to 24 hours preferably for 18 hours, thus producing the 2-fluoromethyl-Δ²-androsten compounds (IV).

Alternatively, the esters of the 2-halomethyl-Δ²-androstenes object of the present invention may be obtained by conventional esterification of the free compounds (III and IV: $R^2$=H), that is, by treatment with acid anhydrides or chlorides of less than 12 carbon atoms in pyridine solution for the 17-unsubstituted 2-halomethyl-androstenes and 19-nor-androstenes or with acid anhydrides in benzene solution and in the presence of p-toluenesulfonic acid for the 17α-alkyl, alkenyl and alkynyl derivatives.

The new method for producing 2α-halomethyl 17α- substituted androstan derivatives is illustrated by the following sequence of reactions:

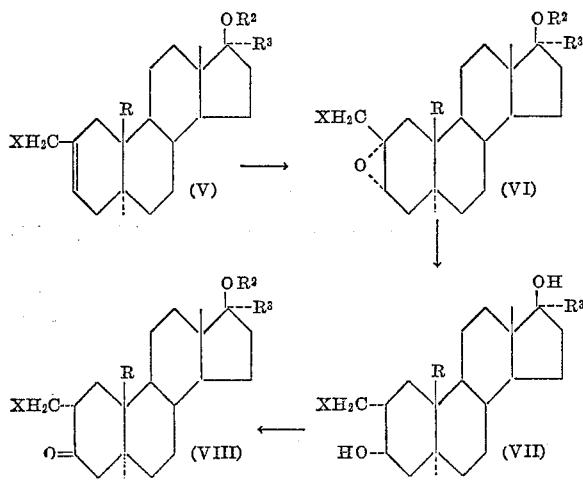

In the above formulas R, $R^2$ and X have the same meaning as previously set forth; $R^3$ represents a lower alkyl or alkynyl group.

In practicing the process set forth above, a 2-halomethyl derivative of $\Delta^2$-androsten-17$\beta$-ol, which is further substituted at C-17$\alpha$ by an alkyl or alkynyl group, or the corresponding 19-nor-derivatives (V), is treated with 1.1 molar equivalents of a peracid, preferably monoperphthalic or perbenzoic acid, to give the corresponding 2$\beta$-halomethyl-2$\alpha$,3$\alpha$-oxido compounds (VI). Upon treatment of these epoxides with lithium aluminum hydride in tetrahydrofuran solution at reflux temperature and for a prolonged period of time, preferably during 18 hours, the epoxide ring is opened, thus producing the 2$\alpha$-halomethyl-3$\alpha$-hydroxy derivatives (VII), with concomitant saponification at C-17, when an ester has been used as the starting material.

Oxidation of the above compounds with 8 N chromic acid in acetone solution or with chromic acid in acetic acid produce the corresponding 3-ketone (VIII: $R^2$=hydrogen), which are then esterified by the methods hereinabove set forth, thus producing the esters of 2$\alpha$-halomethyl 17$\alpha$-alkyl and 17$\alpha$-alkynyl-androstan-17$\beta$-ol-3-one and the esters of 2$\alpha$-halomethyl-17$\alpha$-alkyl and 17$\alpha$-alkynyl-19-nor-androstan-17$\beta$-ol-3-one (VII: $R^2$=acyl).

By partial hydrogenation of the 2-halomethyl-17$\alpha$-alkynyl compounds (VIII: $R^3$=alkynyl) using 2% palladium on calcium carbonate as catalyst and in pyridine solution there are obtained the 2$\alpha$-halomethyl-17$\alpha$-alkenyl derivatives.

Thus for example, starting from 2-chloromethyl-17$\alpha$-ethynyl-$\Delta^2$-androsten-17$\beta$-ol there are obtained successively 2$\beta$-chloromethyl-2$\alpha$,3$\alpha$-oxido-17$\alpha$-ethynyl-androstan-17$\beta$-ol acetate, 2$\alpha$-chloromethyl-17$\alpha$-ethynyl-androstan-3$\alpha$,17$\beta$-diol, 2$\alpha$-chloromethyl-17$\alpha$-ethynyl-androstan-17$\beta$-ol-3-one and 2$\alpha$-chloromethyl-17$\alpha$-vinyl-androstan-17$\beta$-ol-3-one.

In another aspect of the present invention the 2$\alpha$-chloromethyl, 2$\alpha$-bromomethyl and 2$\alpha$-fluoromethyl-androstan-17$\beta$-ol-3-one, the 17$\alpha$-alkyl substituted derivatives and the corresponding 19-nor compounds are obtained by the method illustrated by the following equation:

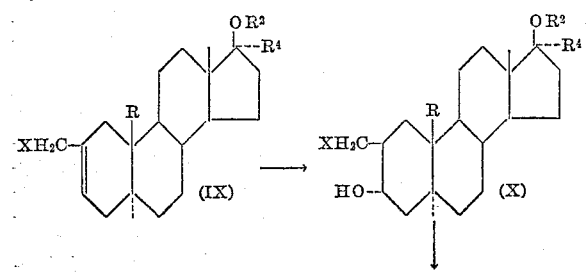

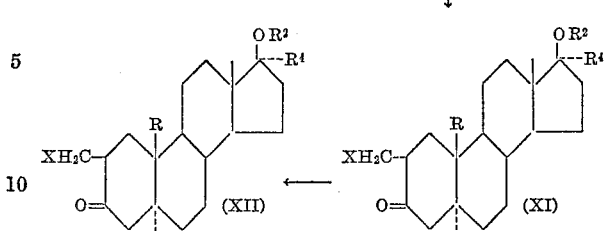

In the above formulas R, $R^3$ and X have the same meaning as heretofore set forth; $R^4$ represents hydrogen or lower alkyl.

In practicing the process outlined above, a 2-halomethyl derivative of $\Delta^2$-androsten-17$\beta$-ol, which may be further substituted at C-17$\alpha$ by a lower alkyl group, or the corresponding 19-nor derivatives (IX), is treated with a current of diborane in a solvent such as tetrahydrofuran. Upon subsequent reaction with aqueous alkali and hydrogen peroxide there is formed the 3$\alpha$-hydroxy-2$\beta$-halomethyl derivative (X) which is converted into the 3-keto compound (XI) upon reaction with chormium trioxide in acetic acid or acetone solution.

The inversion of the steric configuration of the halomethyl substituent at C-2 is effected by acid treatment, preferably using anhydrous hydrogen chloride in chloroform solution, thus producing 2$\alpha$-halomethyl androstan-17$\beta$-ol-3-one, 2$\alpha$-halomethyl-17$\alpha$-alkyl androstan-17$\beta$-ol-3-one and the corresponding 19-nor compounds and esters (XII).

The novel compounds represented by Formulas VIII and XII are potent anabolic agents having a favorable anabolic-androgenic ratio; exhibit anti-estrogenic and anti-gonadotrophic activities; relieve premenstrual tension, lower the blood cholesterol and have anti-fibrillatory properties.

The following examples serve to illustrate but are not intended to limit the scope of the present invention.

PREPARATION 1

To a solution of 5 g. of 2-hydroxymethyl-17$\alpha$-methyl-$\Delta^2$-androsten-17$\beta$-ol in 100 cc. of anhydrous benzene there were added 1 g. of p-toluenesulfonic acid and 15 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 2-acetoxymethyl-17$\alpha$-methyl-$\Delta^2$-androsten-17$\beta$-ol-acetate.

A mixture of 2 g. of the above compound and 20 cc. of a 1% potassium hydroxide solution was stirred for 1 hour at 0° C.; it was then poured into water and the formed precipitate collected by filtration, thus giving 2-hydroxymethyl - 17$\alpha$ - methyl - $\Delta^2$ - androsten - 17$\beta$ - ol-acetate.

PREPARATION 2

By the same method of Preparation 1, 2-hydroxymethyl-17$\alpha$-methyl-19-nor-$\Delta^2$-androsten-17$\beta$-ol, 2-hydroxymethyl-17$\alpha$-ethyl-$\Delta^2$-androsten-17$\beta$-ol, 2-hydroxymethyl-17$\alpha$-vinyl-$\Delta^2$-19-norandrosten-17$\beta$-ol, 2 - hydroxymethyl-17$\alpha$-ethinyl-$\Delta^2$-androsten-17$\beta$ - ol and 2 - hydroxymethyl-17$\alpha$-ethinyl-$\Delta^2$-19-nor-androsten-17$\beta$-ol were converted into the corresponding 17-acetates, namely 2-hydroxymethyl-17$\alpha$-methyl-19-nor-$\Delta^2$-androsten-17$\beta$-ol-acetate, 2-hydroxy-methyl-17$\alpha$-ethyl-$\Delta^2$-androsten-17$\beta$-ol-acetate, 2-hydroxy-methyl-17$\alpha$-vinyl-$\Delta^2$-19-nor-androsten-17$\beta$-ol acetate, 2-hydroxymethyl-17$\alpha$-ethinyl-$\Delta^2$-androsten - 17$\beta$ - ol-acetate and 2-hydroxymethyl-17$\alpha$-ethinyl-19-nor-$\Delta^2$-androsten-17$\beta$-ol acetate.

Example I

A solution of 2.5 g. of 2-hydroxymethyl-$\Delta^2$-androsten-17$\beta$-ol in 250 cc. of dry benzene thiofene free was treated with 2.5 cc. of freshly distilled thionyl chloride and the reaction mixture was kept at room temperature during 1 hour. It was then diluted with water and the organic layer washed well with 5% sodium carbonate solution and water, dried over anhydrous sodium sulfate and evaporated to dryness under vacuo. The residue was filtered through a column of 100 g. of acetic acid washed alumina using 500 cc. of benzene-hexane 1:1 as solvent. The crystalline fractions were combined and recrystallized from methanol, thus affording 1 g. of 3$\beta$-chloro-2-methylene-androstan-17$\beta$-ol.

A mixture of the above compound (1 g.), 1 g. of lithium chloride and 100 cc. of dimethyl formamide was heated on the steam bath for 18 hours. Water was added and the formed precipitate collected by filtration, thus giving the crude 2-chloromethyl-$\Delta^2$-androsten-17$\beta$-ol which was purified by recrystallization from methanol-water.

A mixture of 1 g. of the latter compound, 4 cc. of pyridine and 2 cc. of acetic anhydride was kept at room temperature overnight. It was then poured into water, and the formed precipitate collected by filtration, thus producing the acetate of 2-chloromethyl-$\Delta^2$-androsten-17$\beta$-ol.

A solution of 2 g. of 2-hydroxy-methyl-$\Delta^2$-androsten-17$\beta$-ol in 80 cc. of methylene chloride was cooled to —70° C. and added to a mixture of 8 g. of anhydrous hydrogen fluoride and 144 g. of tetrahydrofuran previously cooled to —70° C. in a Dry Ice-acetone bath. The mixture was kept standing at —10° C. for 18 hours. It was then carefully poured into water and the excess of hydrogen fluoride decomposed by adding 50 g. of sodium carbonate. The product was then extracted with methylene chloride and the organic extract washed to neutral, dried over anhydrous sodium sulfate and evaporated to dryness under reduced pressure. The crude product was dissolved in 100 cc. of hexane-benzene (1:1) and filtered rapidly through a column of 50 g. of acetic acid washed alumina. The crystalline fractions were combined and recrystallized from methanol, thus giving 0.7 g. of 2-fluoromethyl-$\Delta^2$-androsten-17$\beta$-ol.

A solution of 1 g. of the latter compound in 4 cc. of pyridine was treated with 2 cc. of benzoyl chloride and then heated on the steam bath for 1 hour. The mixture was then poured into ice water and the formed precipitate collected, washed with water and dried. Recrystallization from methylene chloride-hexane afforded the benzoate of 2-fluoromethyl-$\Delta^2$-androsten-17$\beta$-ol.

Example III

A solution of 5 g. of 2-hydroxymethyl-$\Delta^2$-androsten-17$\beta$-ol in 500 cc. of dry benzene, thiophene free was treated with 5 cc. of freshly distilled thionyl bromide and the mixture kept at room temperature for 1 hour. It was then washed with water, 5% sodium carbonate solution and water to neutral, dried and evaporated to dryness under vacuo. The residue was dissolved in 1 lt. of benzene-hexane 1:1 and filtered through a column of 200 g. of acetic acid washed alumina thus producing 3$\beta$-bromo-2-methylene-androstan-17$\beta$-ol.

A mixture of 1 g. of the above compound 1 g. of lithium bromide and 100 cc. of dimethyl-formamide was heated on the steam bath for 18 hours. It was then poured into water and the formed precipitate collected by filtration. Recrystallization from methanol gave the pure 2-bromomethyl-$\Delta^2$-androsten-17$\beta$-ol.

Example IV

By following the method of Example I the compounds listed below under I were treated with thionyl chloride in benzene solution to give the corresponding 3$\beta$-chloro-2-methylene compounds (II), which in turn were converted into the 2-chloromethyl-$\Delta^2$-androsten derivatives (III).

| I | II | III |
|---|----|-----|
| 2-hydroxymethyl-19-nor-$\Delta^2$-androsten-17$\beta$-ol-acetate. | 2-methylene-3$\beta$-chloro-19-nor-androstan17$\beta$-ol-acetate. | 2-chloromethyl-19-nor-$\Delta^2$-androsten-17$\beta$-ol-acetate. |
| 2-hydroxymethyl-17$\alpha$-methyl-$\Delta^2$-androsten-17$\beta$-ol. | 2-methylene-3$\beta$-chloro-17$\alpha$-methyl-androstan 17$\beta$-ol. | 2-chloromethyl-17$\alpha$-methyl-$\Delta^2$-androsten 17$\beta$-ol. |
| 2-hydroxymethyl-17$\alpha$-vinyl-$\Delta^2$-androsten-17$\beta$-ol-caproate. | 2-methylene-3$\beta$-chloro-17$\alpha$-vinyl-androstan-17$\beta$-ol-caproate. | 2-chloromethyl-17$\alpha$-vinyl-$\Delta_2$-androsten-17$\beta$-ol-caproate. |
| 2-hydroxymethyl-17$\alpha$-ethinyl-$\Delta^2$-androsten-17$\beta$-ol. | 2-methylene-3$\beta$-chloro-17$\alpha$-ethinyl-androstan 17$\beta$-ol. | 2-chloromethyl-17$\alpha$-ethinyl-$\Delta^2$-androsten 17$\beta$-ol. |

Example V

By following the method of Example II, 5 g. of 2-hydroxymethyl-17$\alpha$-methyl-$\Delta^2$-androsten-17$\beta$-ol were converted into 2-fluoromethyl - 17$\alpha$ - methyl-$\Delta^2$-androsten-17$\beta$-ol.

To a solution of 1 g. of the latter compound in 20 cc. of anhydrous benzene there were added 200 mg. of p-toluenesulfonic acid and 2 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 2-fluoromethyl-17$\alpha$-methyl-$\Delta^2$-androsten-17$\beta$-ol.

Example VI

In accordance with the esterification method of the preceding example 2 - chloromethyl - 17$\alpha$ - methyl-$\Delta^2$-androsten-17$\beta$-ol was converted into the corresponding acetate.

In a similar manner, but using caproic and propionic anhydride as esterifying agents, there were produced caproate and the propionate of 2-chloromethyl-17$\alpha$-methyl-$\Delta^2$-androsten-17$\beta$-ol.

Example VII

In accordance with the method described in Example III, 1 g. of 2-hydroxymethyl-17$\alpha$-vinyl-$\Delta^2$-androsten-17$\beta$-ol was reacted with thionyl bromide, thus affording 3$\beta$-bromo-2-methylene-17$\alpha$-vinyl-androstan - 17$\beta$-ol. Upon treatment of the above compound with lithium bromide in dimethyl formamide there was produced 2-bromomethyl-17$\alpha$-vinyl-$\Delta^2$-androsten-17$\beta$-ol.

250 mg. of the latter compound were esterified with propionic anhydride in benzene solution and in the presence of p-toluenesulfonic acid, by following the method of the preceding example, thus producing the propionate of 2-bromomethyl-17$\alpha$-vinyl-$\Delta^2$-androsten-17$\beta$-ol.

Example VIII

A slow stream of diborane was passed through a solution of 10 g. of 2-chloromethyl - 17$\alpha$-methyl-$\Delta^2$-androsten-17$\beta$-ol acetate in 150 cc. of tetrahydrofuran for 1 hour. (After 20 minutes the solution became warm and then the temperature slowly subsided.) The excess of diborane was decomposed by careful addition of water. Then 1 lt. of water was added and the formed precipitate was filtered, washed and dried, thus giving 9.6 g. of the organoboron compound.

This material was dissolved in 200 cc. of tetrahydrofuran and treated with 9 g. of sodium hydroxide previously dissolved in 25 cc. of water, and 45 cc. of 35% hydrogen peroxide, stirring and keeping the temperature around 15° C. The mixture was stirred for 2 hours, after this time, the precipitated product was filtered, washed and dried, thus producing 2β-chloromethyl-17α-methyl androstane-3α,17β-diol-17-acetate.

A solution of 2 g. of the above compound in 50 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 2β-chloromethyl - 17α - methyl-androstan-17β-ol-3-one acetate.

A solution of 1 g. of the preceding compound in 50 cc. of dry chloroform was treated with 1 cc. of dry chloroform saturated with hydrogen chloride. After 3 hours at room temperature the reaction mixture was washed with 5% sodium bicarbonate solution and water to neutral, dried over anhydrous sodium sulfate and evaporated to dryness under reduced pressure. The crude product after crystallization from ether-pentane afforded 0.4 g. of 2α-chloromethyl-17α-methyl-androstan-17β-ol-3-one acetate.

*Example IX*

By following the method of Example II, 5 g. of 2-hydroxymethyl-17α-ethinyl-19-nor-Δ²-androsten-17β-ol was converted into 2-fluoromethyl-17α-ethinyl-19-nor-Δ²-androsten-17β-ol. Esterification of the above compound with acetic anhydride in benzene solution and in the presence of p-toluenesulfonic acid gave the corresponding acetate.

A solution of 2.5 g. of 2-fluoromethyl-17α-ethinyl-19-nor-Δ²-androsten-17β-ol-acetate in 100 cc. of chloroform was cooled to 0° C. and mixed with 1.4 g. (1.1 molar equivalents) of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 2β-fluoromethyl-2α,3α-oxido-17α-ethinyl-19-nor-androstan-17β-ol acetate.

A solution of 1 g. of the preceding epoxide in 50 cc. of tetrahydrofuran was added over a 30 minute period to a stirred suspension of 1 g. of lithium aluminum hydride in 50 cc. of anhydrous tetrahydrofuran. The mixture was refluxed for 18 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 2α-fluoromethyl-17α-ethinyl-19-nor-androstan-3α,17β-diol.

Upon oxidation of the above diol with 8 N chromic acid in acetone solution, in accordance with the method of Example VIII there was obtained 2α-fluoromethyl-17α-ethinyl-19-nor-androstan-17β-ol-3-one which was esterified with propionic anhydride in benzene solution and in the presence of p-toluenesulfonic acid, to give the corresponding propionate.

*Example X*

By following the methods of Examples II and VIII, the acetate of 2-hydroxymethyl-19-nor-Δ2-androsten-17β-ol was converted successively into 2-fluoromethyl-Δ²-19-nor-androsten-17β-ol-acetate, 2β-fluoromethyl-19-nor-androstane-3α,17β-diol-17-acetate and 2α-fluoromethyl-19-nor-androstan-17β-ol-3-one-acetate.

*Example XI*

A solution of 1 g. of 2α-fluoromethyl-17α-ethinyl-19-nor-androstan-17β-ol-3-one in 40 cc. of pyridine was hydrogenated at 25° C. and 570 mm. in the presence of 400 mg. of pre-hydrogenated 2% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave 2α-fluoromethyl-17α-vinyl-19-nor-androstan-17β-ol-3-one.

The above compound was esterified with acetic, propionic and undecenoic anhydride in benzene solution and in the presence of p-toluenesulfonic acid, thus producing the corresponding esters.

*Example XII*

Examples I and IX were repeated but using 2-hydroxymethyl-17α-ethyl-Δ²-androsten-17β-ol acetate as starting material. There were thus obtained successively 2-methylene - 3β - chloro - 17α - ethyl - androstan - 17β - ol-acetate, 2 - chloromethyl - 17α - ethyl - Δ² - androsten-17β-ol acetate, 2β-chloromethyl-2α,3α-oxido-17α-ethyl-androstan-17β-ol acetate, 2α-chloromethyl-17α-ethyl-androstane-3α,17β-diol, 2α-chloromethyl-17α-ethyl-androstan-17β-ol-3-one and 2α-chloromethyl-17α-ethyl-androstan-17β-ol-3-one propionate.

*Example XIII*

5 g. of 2-chloromethyl-Δ²-androsten-17β-ol were converted into the corresponding benzoate by treatment with benzoyl chloride in pyridine solution.

The above benzoate was then subjected to the reactions described in Example VIII, thus producing 2β-chloromethyl-androstane-3α,17β-diol - 17 - benzoate, 2β-chloromethyl-androstan-17β-ol-3-one benzoate and 2-α-chloromethyl-androstan-17β-ol-3-one benzoate.

In a similar manner, starting with 2-bromomethyl-Δ²-androsten-17β-ol there were obtained successively 2-bromomethyl - Δ² - androsten - 17β - ol-benzoate, 2β-bromomethyl-androstane-3α,17β-diol 17-benzoate, 2β-bromomethyl-androstan-17β-ol-3-one benzoate and 2α-bromomethyl-androstan-17β-ol-3-one benzoate.

*Example XIV*

In accordance with the method of Example III, 2 g. of 2 - hydroxymethyl - 17α-ethinyl-androstan-17β-ol acetate were treated with thionyl-bromide, to give 3β-bromo-2-methylene-17α-ethinyl-androstan-17β-ol acetate, which upon reaction with lithium bromide in dimethyl-formamide gave 2-bromethyl-17α-ethinyl-Δ²-androsten-17β-ol-acetate.

The latter compound was then converted into 2α-bromomethyl-17α-ethinyl-androstan-17β-ol-3-one, by following the method of Example IX.

*Example XV*

2 g. of 2-chloromethyl-17α-ethinyl-Δ²-androsten-17β-ol-acetate were oxidized with monoperphthalic acid, in accordance with the method of Example IX, and the resulting epoxide refluxed for 18 hours with lithium aluminum hydride thus giving 2α-chloromethyl-17α-ethinyl-androstane-3α,17β-diol.

A solution of 250 mg. of chromic acid in 5 cc. of 80% acetic acid was added dropwise to a stirred solution of 1 g. of 2α-chloromethyl-17α-ethinyl-androstan-3α,17β-diol in 75 cc. of glacial acetic acid, while the temperature was maintained around 20° C. After 2 hours at room temperature, the mixture was poured into ice water and the formed precipitate collected, washed with water and recrystallized from methanol, thus giving 2α-chloromethyl-17α-ethinyl-androstan-17β-ol-3-one.

The above compound was esterified with acetic and cyclopentylpropionic anhydride in benzene solution and in the presence of p-toluenesulfonic acid, to give the acetate and the cyclopentylpropionate of 2α-chloromethyl-17α-ethinyl-androstan-17β-ol-3-one.

*Example XVI*

By following the method of Example XI, 2α-bromomethyl-17α-ethinyl-androstan-17β-ol-3-one and 2α-chloromethyl - 17α-ethinyl-androstan-17β-ol-3-one cyclopentylpropionate were converted respectively into 2α-bromomethyl-17α-vinyl-androstan-17β-ol-3-one and 2α-chloromethyl-17α-vinyl-androstan-17β-ol-3-one cyclopentylpropionate.

*Example XVII*

In accordance with the methods of Examples II and VIII, 5 g. of 2-hydroxymethyl-17α-methyl-19-nor-Δ²-androsten-17β-ol acetate were converted successively into 2-fluoromethyl-17α-methyl - 19 - nor-Δ²-androsten-17β-ol acetate 2β-fluoro-methyl-17α-methyl-19-nor-androstan-3α, 17β-diol-17-acetate, 2β-fluoromethyl-17α-methyl-19 - nor androstan 17β-ol-3-one acetate and 2α-fluoromethyl-17α-methyl-19-nor-androstan-17β-ol-3-one-acetate.

We claim:
1. A compound of the following formula:

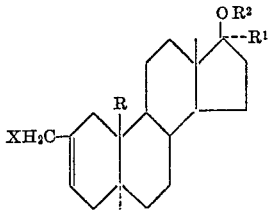

wherein X is selected from the group consisting of chlorine, bromine and fluorine, R is selected from the group consisting of hydrogen and methyl; $R^1$ is selected from the group consisting of hydrogen, lower alkyl, lower alkenyl and lower alkynyl radicals and $R^2$ is selected from the group consisting of hydrogen and a hydrocarbon carboxylic radical of less than 12 carbon atoms.

2. 2-chloromethyl-Δ²-androsten-17β-ol.
3. 2-bromomethyl-Δ²-androsten-17β-ol.
4. 2-fluoromethyl-Δ²-androsten-17β-ol.
5. 2-chloromethyl-19-nor-Δ²-androsten-17β-ol, acetate.
6. 2-chloromethyl-17α-methyl-Δ²-androsten-17β-ol.
7. 2-fluoromethyl-17α-ethynyl-Δ²-androsten-17β-ol.
8. The acetate of 2-fluoromethyl-17α-methyl-Δ²-androsten-17β-ol.
9. 2α - fluoromethyl - 17α - ethynyl - 19 - nor - androstan-17β-ol-3-one.
10. 2α - fluoromethyl - 17α - vinyl - 19 - nor - androstan-17β-ol-3-one.
11. 2α - chloromethyl - 17α - ethynyl - androstan - 17β-ol-3-one.
12. 2α - chloromethyl - 17α - vinyl - androstan - 17β-ol-3-one-cyclopentylpropionate.
13. 2α - bromomethyl - 17α - ethynyl - androstan - 17β-ol-3-one.
14. The method for the production of 2α-halomethyl-17-substituted androstanes which comprises treating the corresponding 2-halomethyl-Δ²-compound with a peracid, reacting the 2α,3α-epoxide thus formed with lithium aluminum hydride in a suitable solvent to give the 2α-halomethyl-3α-hydroxy compound, and oxidizing with chromium trioxide to form the corresponding 3-keto compound.
15. The method for the production of a compound selected from the group consisting of 2α-halomethyl-androstan-17β-ol-3-one compounds and the corresponding 17α-alkyl derivatives, which comprises treating a corresponding 2-halomethyl-Δ²-androstan-17β-ol with diborane, followed by hydrogen peroxide-alkaline treatment, to give the corresponding 2β-halomethyl-3α-hydroxy compound, oxidizing to the 3-keto and thereafter treating with acid to form the corresponding 2α-halomethyl-androstan-17β-ol-3-one derivative.
16. The method of claim 15 wherein the 2α-halomethyl derivative is the chloromethyl derivative, the peracid is the monoperphthalic acid, the suitable solvent for the reduction is tetrahydrofuran.
17. The method of claim 15 wherein the 2α-halomethyl derivative is the bromomethyl derivative, the peracid is the monoperphthalic acid, the suitable solvent for the reduction is tetrahydrofuran.
18. The method of claim 15 wherein the 2α-halomethyl derivative is the fluoromethyl derivative, the peracid is the monoperphthalic acid, the suitable solvent for the reduction is tetrahydrofuran.

No references cited.